Feb. 9, 1932.   K. R. DIENES   1,844,566
MILLING CUTTER PRESSED FROM SHEET METAL
Filed Oct. 27, 1930
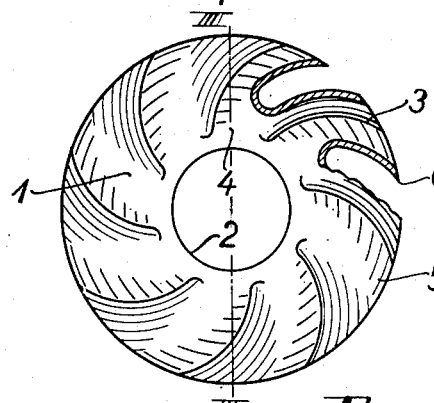
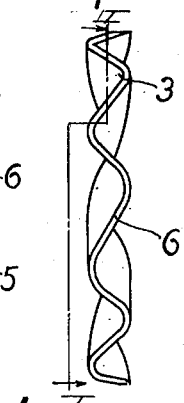
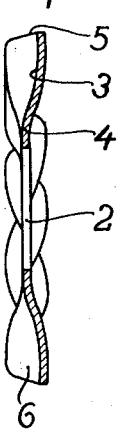
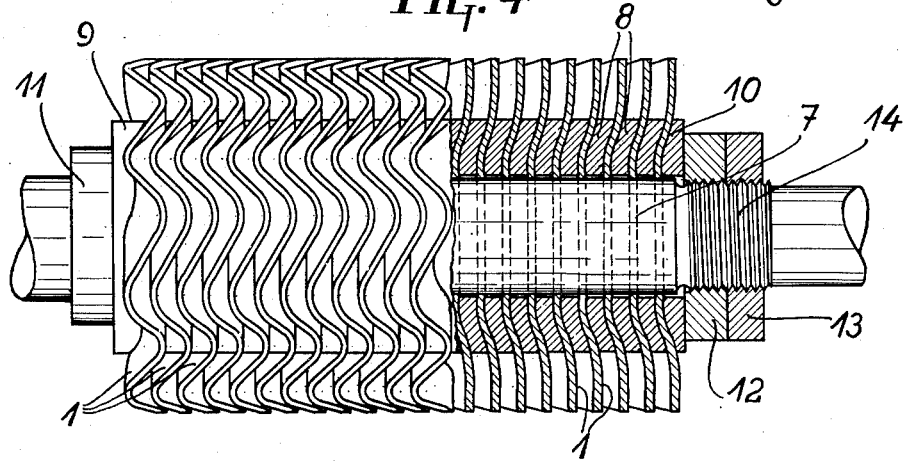
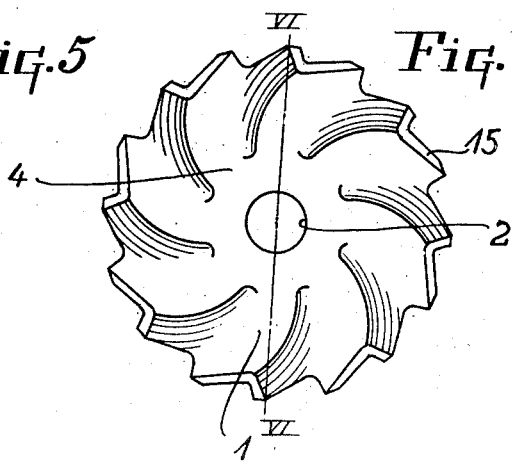
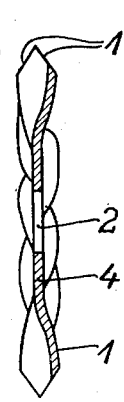
Karl Rudolf Dienes Patented Feb. 9, 1932

1,844,566

UNITED STATES PATENT OFFICE

KARL RUDOLF DIENES, OF VILKERATH, GERMANY

MILLING CUTTER PRESSED FROM SHEET METAL

Application filed October 27, 1930, Serial No. 491,602, and in Germany April 15, 1930.

I have filed applications for this invention in Germany April 15, 1930; in Great Britain October 3, 1930; and in France October 7, 1930.

The invention relates to a special type of milling cutter composed of a disc of sheet metal, the periphery being corrugated by a series of folds running from the centre to the rim and pressed alternately from both sides of the disc, so that when the cutter is ground cylindrically, there are formed at its periphery, cutting edges which are alternately disposed to the plane of the milling cutter, and which render it suitable, when revolved at an appropriate speed about its axis, for working suitable materials, such as skiving leather, paper or the like.

Hitherto in milling tools made of sheet metal, the recesses forming the peripheral corrugations of the milling cutters ran from the middle flat clamping surface around the central hole towards the edge in a radial direction, thereby intersecting the peripheral surface at right angles. Thus the cutting edges produced by cylindrical grinding are of right angled cross-section at each side so that they are relatively blunt and their action is more scraping than cutting. Apart from their use for certain special purposes, the practical value of such tools is therefore relatively small.

According to the present invention, it is possible to give the cutting edges on these milling tools an acutely sharpened form on one side without altering the simple cylindrical grinding so that when they revolve in the direction of this cutting side, they can exert a more or less knife-like action just like an ordinary milling cutter and are therefore suitable for the most diverse milling purposes especially those requiring high speed cutters. According to the invention, this is made possible by arranging that the recesses alternately pressed in both sides of the sheet metal member do not run in a radial straight line towards the edge of the disc but preferably in a curve running out more or less tangential at the edge, so that the direction of cut of the cylindrical surface produced by grinding the undulated peripheral recesses, is not at a right angle but at a sharp acute angle. The peripheral faces of the sheet metal member produced by this cylindrical grinding have unequal angles at the edge due to the edge nearer the cylinder axis having an acute form and the edge more remote from this axis an obtuse form. During the rotation of the cutter, the acute edges, when leading, therefore act just like the cutting edges of a normal cylindrical facing mill, having the cutting edges arranged obliquely or running spirally with respect to the axis of rotation.

The cylindrical cutting faces 5 of the sheet metal disc which are made of undulating shape by pressing in these channels, form acute cutting angles at the hollow side of the axial bending of the channels or at the edges of the sheet facing the cylinder axis, so that these edges may be used as cutting knives 6. The cutting angle of these edges may, as will be easily seen, be predetermined as desired by fixing the angle of slope of the channel-shaped recesses with respect to the radius or to the periphery of the plate discs.

For many purposes a more or less large number of these single cutters may be combined to form a facing mill, as is shown in Fig. 4. Here the individual cutters 1, are threaded on a milling spindle 7, spaced by distance rings 8, in such a way that the undulations of their edges alternately fit into each other. The distance rings, preferably of unhardened flexible material, such as thick sheet brass, are pressed to the surface form of the individual cutters themselves, so that the latter are clamped together not only at their central flat clamping surface 4, but beyond this over a certain radial distance.

The end rings 9 and 10 situated outside the two outer cutters are preferably flat at their external surfaces. As compared with milling cutters of this kind worked from the solid, those pressed from sheet according to the present invention are exceedingly simple and cheap to manufacture.

The invention will be better understood by referring to the accompanying drawings.

Fig. 1 being a single cutter according to the invention, partly in elevation viewed from the flat side, and partly in section on line I—I of Fig. 2, Fig. 2 a view of the cutter from the edge, Fig. 3 a cross-section on line III—III of Fig. 1, Fig. 4 a view partly in side elevation and partly in axial section of a cylindrical facing mill composed of a large number of separate cutters.

Fig. 5 is a view looking from the flat side of a single flat cutter according to the invention, and ground in the circumference to an acute profile.

Fig. 6 shows a cross-section on line VI—VI of Fig. 5.

The body of the cutter consists of a circular sheet metal disc 1, which is provided in the middle with a central hole 2 for clamping the tool to the milling spindle, the edge of the cutter being bent to either side in an undulating or zig-zag shape with respect to the middle plane of the cutter, by channel-shaped recesses 3, pressed into the plate disc from alternate sides. The channel-shaped recesses 3, commence only at a certain distance from the centering hole, thus leaving a flat annular surface 4, for clamping the tool on to a mandrel of suitable width. The channels themselves preferably follow a circular or spiral course and gradually become deeper towards the edge of the disc which intersects with the channel at a uniformly acute angle. One of these rings 9, rests against a collar 11 on the cutter spindle 7. The end ring 10 is arranged against a clamping nut 12 which together with a lock nut 13, is arranged on a threaded shoulder 14 of the shaft. By means of the nuts 12 and 13, the cutters 1, may thus be clamped between the rings whilst they are indisplaceably supported by their center holes on the machined surface of the cutter spindle.

As will be seen, all the cutting knives may be sharply ground by a cylindrical grinding of the cylindrical faces formed by the edges of the metal disc 1, and whenever they become blunt they can always be re-ground.

For certain kinds of work the peripheral surface of the single cutters as well as of the combined cutter may have a different profile other than a simple cylinder. For instance, as will be seen in Figs. 5 and 6, the individual cutters corresponding to those of Figs. 1–3 have their surface not ground cylindrically but conical on each side and with an acute angled or arcuate cross-section.

What I claim is:

1. A milling cutter pressed from sheet metal, particularly for soft materials, the peripheral portions being alternately bent out with respect to the middle plane by pressing channel-shaped recesses therein running to the edge, the said peripheral portions acting as cutting edges set obliquely to the plane of rotation, characterized in this, that the course of the channel-shaped recesses is curved and is so set that it forms an acute angle with the radii of the cutter disc.

2. A composite cylindrical milling cutter composed of several cutters as in claim 1, characterized in this, that the individual cutters are threaded on a common milling spindle and are clamped together but spaced apart by annular discs of soft metal with their surface form pressed to suit that of the cutters.

3. A milling cutter blade consisting of a disc having a convoluted margin and a substantially flat center portion, the convolutions of the margin extending to and merging into the center along arcuate lines whereby to form a series of spaced arcuate channels on each face of the disc, said channels gradually deepening from the center to the periphery of the disc and being open at the peripheral ends whereby the peripheral edges of the convolutions form oblique cutting edges.

4. A built up milling cutter consisting of a mandrel, a series of plastic but strong washers mounted on said mandrel, a series of milling cutter blades mounted on the mandrel alternately with the washers and having each a marginal portion and a flat central portion of less diameter than the washers, each marginal portion having a convoluted periphery forming cutting edges and channels extending from the peripheral convolutions to the flat central portions, and means to force the blades and washers together and embed the marginal portions of the washers in the inner portions of the channels to secure the blades against rotation with respect to each other.

In testimony whereof I affix my signature.

KARL R. DIENES.